United States Patent
Dalal

(10) Patent No.: US 7,760,715 B1
(45) Date of Patent: Jul. 20, 2010

(54) CIRCUIT AND METHOD FOR RATE-LIMITING A SCHEDULER

(75) Inventor: Parin Bhadrik Dalal, Milpitas, CA (US)

(73) Assignee: Parin B. Dalal, Milpitas, CA (US)

( * ) Notice: Subject to any disclaimer, the term of this patent is extended or adjusted under 35 U.S.C. 154(b) by 314 days.

(21) Appl. No.: 11/890,131

(22) Filed: Aug. 4, 2007

Related U.S. Application Data

(60) Provisional application No. 60/835,505, filed on Aug. 4, 2006.

(51) Int. Cl.
*H04Q 11/00* (2006.01)
(52) U.S. Cl. .................... 370/360; 370/412
(58) Field of Classification Search ......... 370/229–235, 370/411, 412, 390, 395
See application file for complete search history.

(56) References Cited

U.S. PATENT DOCUMENTS

| | | | |
|---|---|---|---|
| 2005/0175014 A1* | 8/2005 | Patrick | 370/395.43 |
| 2007/0104210 A1* | 5/2007 | Wu et al. | 370/412 |
| 2007/0226332 A1* | 9/2007 | Becker-Szendy et al. | 709/224 |
| 2007/0253439 A1* | 11/2007 | Iny | 370/413 |
| 2007/0297417 A1* | 12/2007 | Cohen et al. | 370/395.42 |
| 2008/0207245 A1* | 8/2008 | Wakabayashi et al. | 455/522 |

* cited by examiner

*Primary Examiner*—Ricky Ngo
*Assistant Examiner*—Gary Mui

(57) ABSTRACT

This invention provides a data structure and circuit method to rate limit a scheduler. An admission scheduler is used to identify the times necessary to update the profile information of the flows being scheduled. Rate check and profile check logic transfer flows between the two schedulers. Rate-limited and non-rated limited flows are then scheduled independently.

6 Claims, 1 Drawing Sheet

CIRCUIT AND METHOD FOR RATE-LIMITING A SCHEDULER

CROSS-REFERENCE TO RELATED APPLICATIONS

Figure 1:
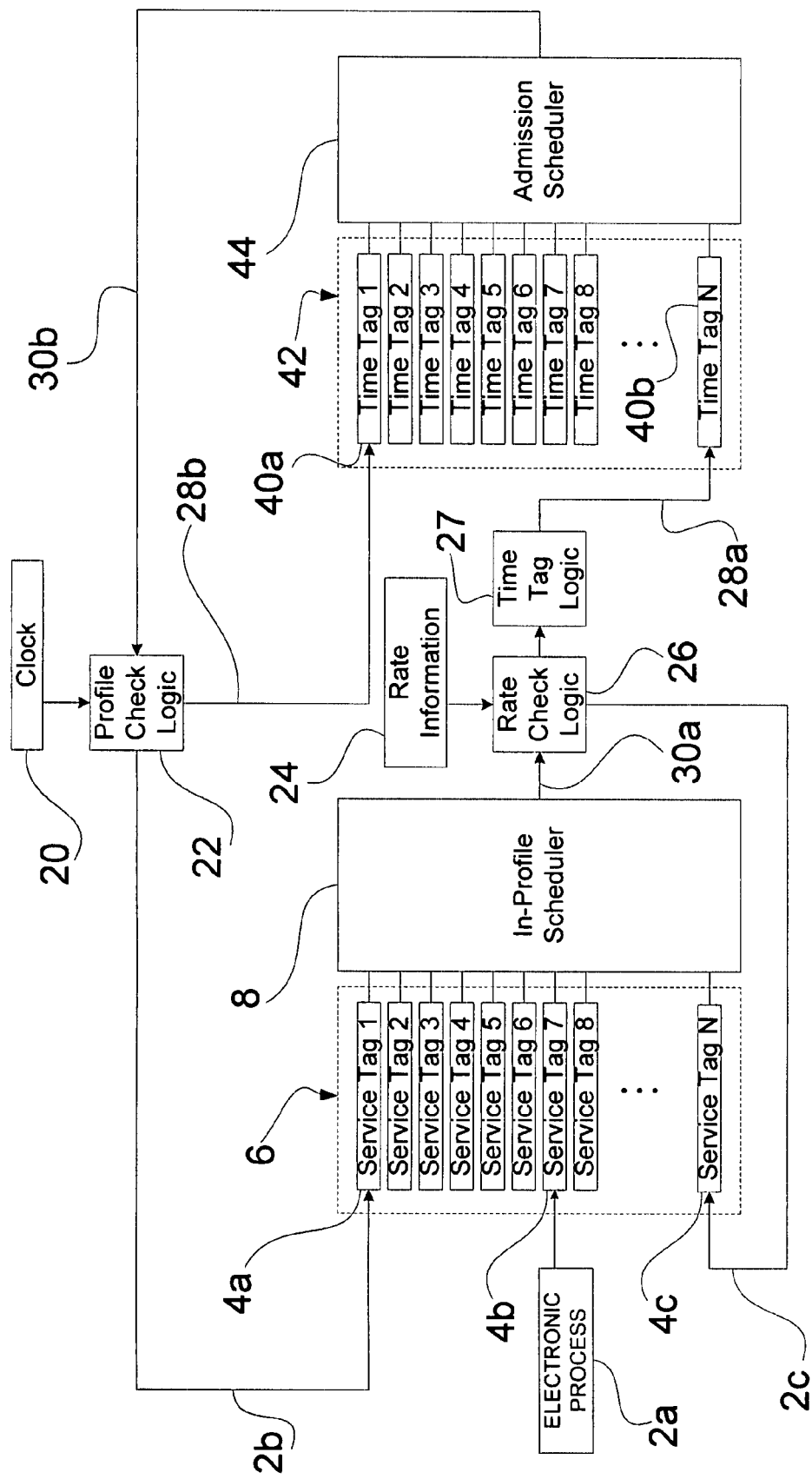

This application claims the benefit of provisional patent application No. 60/835,505 filed 2006 Aug. 4 by the present inventor.

FEDERALLY SPONSORED RESEARCH

Not Applicable

SEQUENCE LISTING

Not Applicable

BACKGROUND

1. Field of Invention

This invention relates to a method for improving a scheduler (also called an arbiter). More particularly this method can limit the rate at which an arbiter can render an arbitration decision to the same party. This invention is particularly advantageous for implementation in digital computer hardware. The primary application of current interest is to circuit based schedulers that manage traffic in high-speed switches and routers. However, the technique may be useful in a variety of applications involving input data that is stored and then retrieved based on the priority of Service Tags. Consequently, data retrieved arbitrates between the data stored. The data stored may be considered as separate flows each contending for the retrieval resource. Often times, a particular application needs to limit the rate at which one party, or flow, is selected by the scheduler. This is useful for preventing the downstream congestion of another resource specific to the over-selected flow, or for enforcing service contracts for particular flows.

A very useful application of this invention is in construction of devices which participate in Internet Protocol (IP) networks or Asynchronous Transfer Mode (ATM) networks. The following discussion reviews how the features of an arbitration scheme can lead to "rich networking services" or traffic management, and how this invention's arbitration enhancement provides better traffic management.

At every point of contention in a network, packets or cells must be prioritized to ensure Service Level Agreements (SLA). Underlying, identified flows often serve as the prioritization criterion. This re-ordering of packets modifies the traffic shape of these flows and requires a buffer.

The scheduling discipline chosen for this prioritization, or Traffic Management (TM), can affect the traffic shape of flows and micro-flows through: Delay (buffering); Bursting of traffic (buffering and bursting); Smoothing of traffic (buffering and rate-limiting flows); Dropping traffic (choosing data to discard so as to avoid exhausting the buffer); Delay jitter (temporally shifting cells of a flow by different amounts); Not admitting a connection (cannot simultaneously guarantee existing SLAs with an additional flow's SLA).

In current non-centralized router architectures, the TM provided by the switch fabric consists of a small number of depth-limited queues of strict priority. Therefore, the TM on the ingress and egress of each line card must carry the burden of enforcing SLAs. This includes providing the agreed upon data-rate and not providing more than the maximum data-rate.

2. Prior Art

The standard method of rate limiting involves marking each individual flow as In-Profile or Out-of-Profile. This marking has to be done continuously as flows go from over the maximum data-rate to under the agreed upon data-rate (and vice-versa) as time progresses. As such, the amount of new information to be processed in the scheduling decision can be commensurate with the number of flows: if all the flows change their current profile, all that information must be factored into the scheduling decision.

This invention serves to reduce the amount of profile-related information flux inputted to the scheduler, and so it increases the speed of the scheduler or the number of flows the scheduler can arbitrate at the same speed. This is because a simple circuit scheduler (one incapable of rate-limiting) is conventionally faster than a circuit scheduler that must schedule and rate limit at the same time. This increase in performance is very useful in the traffic management of networks.

SUMMARY

This invention is a circuit-based method to provide rate-limiting features for a scheduler. It allows a scheduler that stores the profile state of each flow, to rate-limit each flow with very little impact on its scheduling speed. This invention describes a method that reduces the number of circuit components used at a particular time by incorporating two novel restrictions: (1) marking an Out-of-Profile flow as In-Profile only if that particular flow will be selected in the next scheduling decision; (2) every flow that turns Out-of-Profile is marked as such only during the particular scheduling decision selecting that flow.

This invention presents a class of methods that use an auxiliary scheduler, termed an Admission Scheduler, to reduce the flux of out-of-profile flows that change to in-profile flows processed by a non-rate-limiting scheduler, termed an In-Profile Scheduler. This reduction is accomplished by only admitting those flows that stand a chance of being scheduled by the In-Profile scheduler. The selection of these flows is determined by the Admission Scheduler that selects the highest priority, in-profile flow, termed the Admission Scheduler's Winner. Similarly, every flow that turns Out-of-Profile can be marked as such during the last scheduling decision selecting that flow.

DRAWINGS

Figures

In the drawings, closely related elements have the same numeral but different alphabetic suffixes.

FIG. 1 illustrates the way in which this invention may be applied to a scheduler by the use of some intermediary logic and a separate Admission Scheduler for Out-of-Profile flows. Additionally, it illustrates the dynamics between the two schedulers with a specific example.

REFERENCE NUMERALS

2a A representation of an electronic process that changes the Service Tag of the $7^{th}$ flow 2b A representation of an electronic process, driven by Profile Check Logic, that marks the Service Tag of the Admission Scheduler's Winner as In-Profile when the Winner is or will be in-profile during the next In-Profile Scheduler decision, admitting the Winner to the In-Profile Scheduler 2c A representation of an electronic process, driven by Rate Check Logic, that marks the Service Tag of the In-Profile Scheduler's Winner as out-of-profile when the Winner has or will exceed his allocated maximum rate, removing the Winner from the In-Profile Scheduler 4a The Service Tag associated with the $1^{st}$ flow that, in this example, has been selected by the Profile Check Logic as returning to in-profile 4b The Service Tag associated with the $7^{th}$ flow that, in this example, has it's service tag changed by some electronic process, be it the scheduler or otherwise 4c The Service Tag associated with the $N^{th}$ flow that, in this example, has been selected by the Rate Check Logic as turning out-of-profile 6 All the state information that the In-Profile Scheduler needs to make its scheduling decision, given in the form of per flow information, or Service Tags 8 The original scheduler, called the In-Profile scheduler that does not rate limit, which is enhanced to rate-limit by the surrounding logic 20 Some indication of the current time or time of the next in-profile scheduling decision 22 Profile check logic that compares the Winner of the Admission Scheduler against 20 and decides if the flow should be removed from the Admission Scheduler and admitted to the In-Profile scheduler 24 Information about the service level for each flow is stored in the Rate Information, so the Rate check logic knows against which profile each flow should be regulated 26 Rate check logic that compares the Winner of the In-Profile Scheduler against the Rate Information for that flow and decides if the flow should be removed from In-Profile Scheduler and Admitted to the Admission Scheduler 27 Time tag logic that converts a flow's priority and rate information to produce a Time Tag for an out-of-profile flow 28a A representation of an electronic process, driven by the Rate Check Logic, admits the Winner from the In-Profile Scheduler to the Admission Scheduler 28b A representation of an electronic process, driven by the Rate Check Logic, admits the Winner from the In-Profile Scheduler to the Admission Scheduler 30a The flow selection of the In-Profile Scheduler, termed the In-Profile Scheduler's Winner 40a The Time Tag associated with the $1^{st}$ flow 40b The Time Tag associated with the $N^{th}$ flow 42 All the state information that the Admission Scheduler need to make its scheduling decision, given in the form of prioritized service times, or Time Tags 44 An auxiliary scheduler, termed the Admission Scheduler, that selects only relevant flows that are returned to in-profile to be marked as such.

DETAILED DESCRIPTION

FIG. 1 illustrates the method applied to a particular In Profile Scheduler 8 within the framework of a particular example. At least one electronic process 2a changes the Service Tags 6, in this example Service Tag number seven 4b is selected. Other mechanisms controlled by this method 2b-2c also modify the Service Tags 6. Rate Check Logic 26 compares the In-Profile Scheduler's winner, in this example 4c, with the rate information 24 specific to that flow, and then possibly takes action 2c, 27 if the flow is out-of-profile. This action includes the Time Tag Logic 27 admitting the flow 28a by modifying that flow's Time Tag 40b. The Admission scheduler 44 provides the Profile Check Logic 22 with its Winner 30b, so that it may compare it against a clock-like signal 20, and possibly take action 2b, 28b in admission and removal. For reference, the number of competing flows has been denoted by the variable N.

Operation

To operate this invention, the In-Profile Scheduler 8 should have information in the Service Tags 6 about the flows it arbitrates indicating which flows are not to be scheduled. Various electronic processes 2a as well as changing the Service Tag of the In-Profile Scheduler Winner 30a may also change this information. When the Winner 30a is deemed to be out of profile (or will be out of profile) by the Rate check logic 26, it admits the flow 28a to the Admission Scheduler 44 by having the Time Tag Logic 27 convert its priority and rate information into a Time Tag 40b. Additionally, in this scenario, the Rate Check Logic 26 modifies 2c the previously described Service Tag information 4c to ensure the flow is not scheduled by the in-Profile Scheduler 8. If the Winner 30a is not of out profile, the Rate Check Logic 26 does not admit or remove flows from either scheduler 6, 42.

The Admission Scheduler 42 finds the earliest Time tag and marks it as its Admission Scheduler Winner 44. The Profile Check Logic 22 checks the Admission Scheduler Winner 44 against the current time of next In-Profile Scheduler 8 decision time 20. If the flow is in profile, the Profile Check Logic 22 admits 2b the flow by changing the Service Tag information 4a. Additionally, in this scenario, the Profile Check Logic removes 28b the Time Tag 40a of the Admission Scheduler Winner 30b. If the Admission Scheduler Winner 30b is not back in profile, the Profile Check Logic 22 does not admit or remove flows from either scheduler 6, 42.

Advantages

From the description above, a number of advantages of some embodiments of my circuit and method for arbitration become evident:

(a) Using this invention a scheduling circuit need not be redesigned to incorporate rate-limiting (b) When conventional rate limiting would slow down the performance of scheduling circuit, it may be redesigned using this invention to produce a high speed scheduler.

CONCLUSION, RAMIFICATION, AND SCOPE

Accordingly, the reader will see that the invention provides a method to enhance existing schedulers to perform rate-limiting as well as produce a new class of circuit-based schedulers that do not lose performance due to the need to rate-limit. Although the invention has been described in connection with a specific embodiment, it is understood that this invention is not limited to the embodiments disclosed, but is capable of various modifications, for example: varying pipelining, alternate Service Tag and Time Tag data representations, alternative reasons for marking a flow as out of profile, varying memory element type and/or size, replacing digital electronics with analog electronics, or mapping parts of the hardware design onto programmable hardware such as FPGAs, which would be apparent to one of ordinary skill in the art. Thus, the invention is limited only by the following claims and their legal equivalents.

I claim:

1. A circuit to schedule between and rate-limit a plurality of flows comprising:
   (a) a first scheduling circuit,
   (b) a second scheduling circuit,
   (c) a first logic device,
   (d) a second logic device,
   (e) said first scheduling circuit arbitrates between a plurality of in-profile flows,
   (f) said second scheduling circuit arbitrates between a plurality of out-of-profile flows,
   (g) said first logic device detects when a scheduled flow of the first scheduling circuit is out-of-profile,
   (h) said first logic device, upon the out-of-profile detection, removes the scheduled flow from said plurality of in-profile flows over which the first scheduler arbitrates and adds said scheduled flow of the first scheduling circuit to said plurality of out-of-profile flows over which the second scheduler arbitrates,
   (i) said second logic device detects when a scheduled flow of the second scheduling circuit is in-profile,
   (j) said second logic device, upon the in-profile detection, removes the scheduled flow from said plurality of out-of-profile flows over which the second scheduler arbitrates and adds said scheduled flow of the second scheduling circuit to said plurality of in-profile flows over which the first scheduler arbitrates,
   (k) the scheduled flow of the first scheduling circuit signals a rate-limited arbitration between said plurality of in-profile flows and said plurality of out-of-profile flows.

2. The circuit in claim 1, wherein said first logic device, at least upon the out-of-profile detection, computes a time tag.

3. The circuit in claim 2, wherein the calculated time tag has a value greater than or equal to a time when scheduling of said scheduled flow of the first scheduling circuit would be in-profile.

4. The circuit in claim 2, wherein the calculated time tag is used by the second scheduling circuit, upon the out-of-profile detection, to prioritize said scheduled flow of the first scheduling circuit.

5. The circuit in claim 1, wherein said second logic device, at least upon the in-profile detection, computes a service tag.

6. The circuit in claim 5, wherein the calculated service tag is used by the first scheduling circuit, upon the in-profile detection, to prioritize said scheduled flow of the second scheduling circuit.

* * * * *